United States Patent [19]

Fukushima

[11] 4,398,107

[45] Aug. 9, 1983

[54] MICRO STEPPING MOTOR

[75] Inventor: Yasuhiro Fukushima, Ichikawa, Japan

[73] Assignee: Kabushiki Kaisha Daini Seikosha, Tokyo, Japan

[21] Appl. No.: 48,187

[22] Filed: Jun. 13, 1979

Related U.S. Application Data

[60] Continuation of Ser. No. 761,437, Jan. 21, 1977, abandoned, which is a division of Ser. No. 556,200, Mar. 6, 1975, abandoned.

[30] Foreign Application Priority Data

| | | | |
|---|---|---|---|
| Mar. 7, 1974 | [JP] | Japan | 49-26655 |
| Jun. 25, 1974 | [JP] | Japan | 49-72509 |
| Jun. 25, 1974 | [JP] | Japan | 49-78098 |
| Jul. 8, 1974 | [JP] | Japan | 49-80436[U] |
| Aug. 29, 1974 | [JP] | Japan | 49-103672[U] |

[51] Int. Cl.³ .......................................... H02K 37/00
[52] U.S. Cl. .................................... 310/49 R; 310/162
[58] Field of Search ................... 310/49, 156, 162–165

[56] References Cited

U.S. PATENT DOCUMENTS

| | | | |
|---|---|---|---|
| 3,142,774 | 7/1964 | Lundin | 310/83 |
| 3,626,263 | 12/1971 | McBride | 310/49 X |
| 4,103,191 | 7/1978 | Kawamura et al. | 310/49 |

Primary Examiner—Donovan F. Duggan
Attorney, Agent, or Firm—Robert E. Burns; Emmanuel J. Lobato; Bruce L. Adams

[57] ABSTRACT

A micro stepping motor for use in compact electronic watches comprises a magnetic core, a coil winding wound on the magnetic core, and a one-piece stator connected to the magnetic core to define therewith a closed magnetic flux path. The stator has a necked portion defining a region of reduced cross-sectional area along its length, and a hole extends through the stator at the center of the necked portion. A rotor having at least one pair of magnetic poles is rotatably disposed within the stator hole with an air gap therebetween. The rotor rest positions are determined by either a pair of protrusions extending into the air gap at diametrically opposed sites about the stator hole, or a pair of recesses opening into the air gap at diametrically opposed sites about the stator hole.

20 Claims, 17 Drawing Figures

4,398,107

MICRO STEPPING MOTOR

RELATED APPLICATIONS

This application is a continuation of application Ser. No. 761,437 filed Jan. 21, 1977 and now abandoned, which in turn is a division of application Ser. No. 556,200 filed Mar. 6, 1975 and now abandoned.

BACKGROUND OF THE INVENTION

The conventional type of a micro stepping motor such as shown in FIG. 1 comprises a rotor 1, a magnetic core 2 having a coil winding L, a stator constructed of two stator pieces 3A and 3B which are fixed to the magnetic core 2 and are opposed with respect to each other around the rotor. A pair of eccentric pins 4A and 4B are respectively positioned in long holes provided in the stator pieces 3A and 3B and it is necessary to accurately adjust the position of the stator pieces 3A and 3B by means of the eccentric pins 4A and 4B for driving the motor in the best condition.

It is difficult to mass-produce and finish the circular portions 3a and 3b of the stator pieces 3A and 3B with a high degree of accuracy. Moreover, the stationary position of the rotor is decided by the fixing in place of the stator pieces 3A and 3B after variably adjusting them to obtain the best motor operating condition.

OBJECTS OF THE INVENTION

The present invention aims at eliminating the above noted drawbacks and therefore it is one object of the present invention to provide a new micro stepping motor construction having a one-piece stator which functions as the two stator elements of the conventional stator.

Another object of the present invention is to provide an improved micro stepping motor wherein a one-piece stator surrounding a rotor is formed of a sheet of plate material so as to eliminate the need for making an adjustment of the air gap between the stators and the rotor.

SUMMARY OF THE INVENTION

According to the present invention, there is provided a micro stepping motor for an electronic timepiece having a rotor composed of a permanent magnet, a stator which has a circular hole in which is positioned the rotor, and a coil winding wound on a core, the stator having a pair of stator portions constructed as one body.

BRIEF DESCRIPTION OF THE DRAWINGS

The above mentioned and further objects, features and advantages of the present invention will become more apparent from the following description when taken in connection with the accompanying drawings which show preferred embodiments of the invention and wherein.

DETAILED DESCRIPTION OF THE INVENTION

Figure 1:
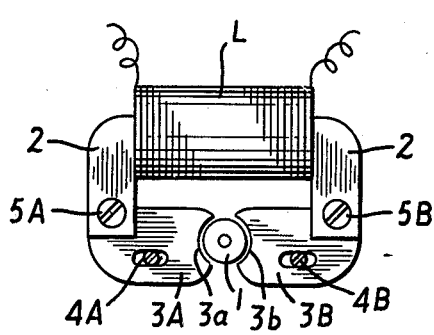
FIG. 1 shows a flat plan view of a conventional prior art type micro stepping motor.
Figure 2:
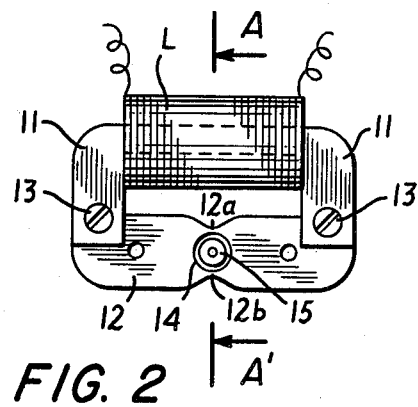
FIG. 2 shows a flat plan view of a first embodiment of a micro stepping motor according to the present invention.

Referring now to the accompanying drawings, FIG. 2 shows the first embodiment of a micro stepping motor according to the present invention. The motor comprises a magnetic core 11 having an inverse U configuration and a coil winding L wound on the core and to which is supplied driving current in the form of timing pulses to alternate polarity. A stator 12 which is made of a soft magnetic material is fixed at its opposite end portions to both sides of the magnetic core by means of screw bolts 13 and 13. The stator 12 is provided in its center with a circular hole 14 in which a magnetic rotor 15 is rotatably mounted. The stator 12 is not formed of two separate stator pieces (like the prior art construction of FIG. 1) but instead is comprised of a single sheet of platelike material having along its length a region of reduced cross-sectional area defined by two concaved portions 12a and 12b which together form a stator necked portion. The total sectional area of the concaved portions 12a and 12b is smaller than the sectional area of the magnetic core 11.

Figure 4:
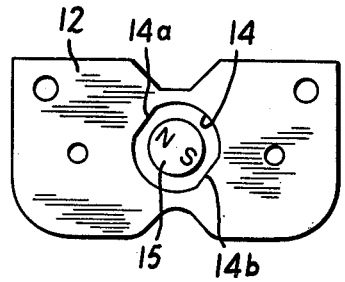
FIG. 4 is an enlarged flat plan view of the stator which is suitable to be used in the micro stepping motor according to the present invention.

In FIG. 4, the stator 12 provided with the circular hole 14 has the rotor 15 rotatably disposed within the hole 14. The circular hole 14 has two protrusions defined by straight edges 14a and 14b which are biased at an angle (30° to 60°) from a vertical straight surface corresponding to a straight line A-A' in FIG. 2 and the edges 14a and 14b determine the stationary or rest positions of the magnetic poles of the rotor. By such a construction, the rotor 15 becomes stationary after the magnetic poles thereof are attracted to the straight edged protrusions 14a and 14b of the stator 12, which has narrow air gaps therebetween, when the coil L is not excited and therefore does not generate a magnetomotive force. However, when a motor driving current flows through the coil L, the magnetic core 11 coacting with the coil L generates a magnetic flux and the magnetic flux from the magnetic core travels a magnetic path in such a way that it passes the stator 12 through the concaved narrow portions 12a and 12b of the necked portion and then back to the magnetic core 11, thereby forming a closed magnetic circuit.

At this time, since the closed magnetic loop consists of the magnetic core 11 and the stator 12, the magnetic permeability of the whole closed magnetic circuit is very high and the magnetic resistance thereof is very low. Therefore the inductance is so large that the current flowing to the coil L does not reach a maximum at the instant when the current is applied thereto, but instead the current gradually increases in value.

Figure 3:
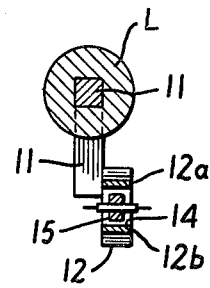
FIG. 3 is a cross sectional view taken on the line A-A' in FIG. 2.

At a certain current value, the closed magnetic circuit has a saturated magnetic flux density in the necked portion where the cross sectional area of the magnetic path is the smallest, that is, in the portions 12a and 12b of the stator 12 shown in FIG. 3.

As the narrow portions of the stator approach saturation, the magnetic permeability thereof remarkably decreases and stray flux (leakage flux) is generated in the region of the stator portions 12a and 12b. At that time, since the magnetic permeability of the concaved portions 12a and 12b of the stator 12 becomes smaller, in the closed magnetic circuit, the magnetic resistance is larger than the magnetic resistance at the time when the current begins to flow through the coil L. Consequently, the current rapidly increases from this time until it reaches its maximum value.

In the meantime, the stray flux increases, and the stator 12 develops a large magnetic potential difference across the straight edges 14a and 14b of the center hole 14. In a manner well known, the magnetic potential difference causes the rotor 15 to rotate.

Further, it is appreciated that the rotor becomes stationary with the magnetic poles attracted to the straight edged protrusions 14a and 14b of the center hole in the stator 12 after rotating in a direction determined by the locations of the recesses or protrusions. Therefore, the stepping motor according to the present invention is regularly driven in a manner similar to the standard stepping motor. The magnetic path of the magnetic flux from the magnetic core flows through the closed magnetic circuit which is composed of soft magnetic material. Further, on the rotor axis which is vertical to the direction of the magnetic path, the total cross sectional area of the stator is smaller than any cross sectional areas of the magnetic path in the closed magnetic circuit or the cross sectional area of the surface vertical to the direction of the magnetic path of the magnetic core so that it is not necessary to adjust the position of the stator. Furthermore, since the stator is formed of a single sheet as one rigid body, the center hole of the stator may be made with a high degree of accuracy at a low cost.

Referring now to the second embodiment of this invention shown in FIGS. 5–8, numeral 8 is a magnetic core on which is wound a coil winding 9, and a stator 12 which houses a rotor 17 is mounted to end portions of the core 8 by screw bolts 10 and 10.

Figure 5:
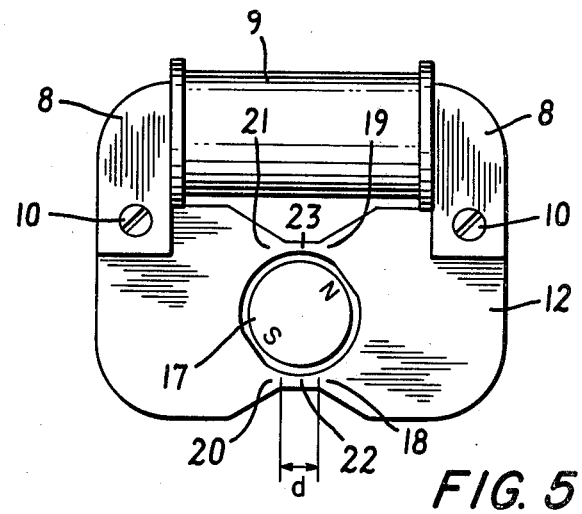
FIG. 5 is a flat plan view of a second embodiment of the micro stepping motor according to the present invention.

In FIG. 5, when a pulse of a given polarity is applied to the coil 9, the magnetic flux generated by the coil 9 is applied to the stator 12, the flux passing to coupling portions 22 and 23 via portions 18 and 19 of the stator 12 and to constricted portions 20 and 21 of the stator 12. On the other hand, when a reverse pulse is applied to the coil winding 9, the magnetic flux passes through the stator 12 in the reverse order. As aforedescribed with reference to FIG. 4, the flux reaches saturation density due to the small cross sectional area of the stator necked portion, i.e. the coupling portions 22 and 23, and a magnetic potential difference is produced across the left hand side and the right hand side at the border of the "d" area in the coupling portions 22 and 23, and the flux activates and rotationally drives the rotor 17 one step.

Figure 6:
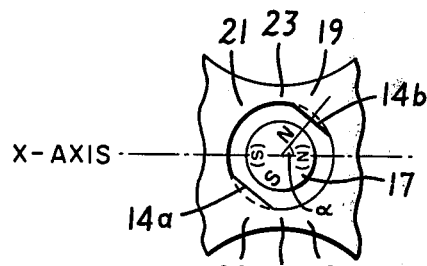
FIG. 6 is an enlarged partial view for explaining the mode of operation of the embodiment in FIG. 5.
Figure 7:
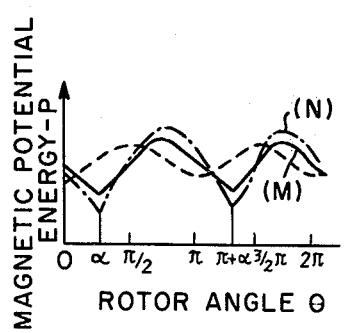
FIG. 7 is a graph showing the characteristic of the rotor angle and the magnetic potential energy for explaining the operation of the assembly shown in FIG. 6.

In FIG. 6, the shape of the stator hole which houses the rotor 17 has a generally circular shape as indicated by a dotted line in FIG. 6, and in this case the relation between the rotor angle $\theta$ and the magnetic potential energy P in FIG. 7 is such that the rotor becomes stationary (stability point) at values of $\theta$ of 0, $\pi$ and $2\pi$ of the rotor as indicated with a dotted line. Further, the housing shape of the stator 12 can be designed to be asymmetric with respect to the X-axis orientation which passes the rotor axis of the rotor 17 as indicated by a solid line in FIG. 6. and in this case the relation between the rotor angle $\theta$ and the magnetic potential energy is such that the rotor becomes stationary at values of $\theta$ of $\alpha$ and $\pi + \alpha$.

At that time, the flux is produced by the coil winding 9 and the magnetic field activates and rotationally drives the rotor 17 one step. The torque T of the rotor 17 which makes the angle $\alpha$ with respect to the magnetic field is as follows, $$T = KaHM \sin \theta$$

In the above formula, "K" is a proportionality constant, "a" is the radius of the rotor, "H" is the magnetic field from the coil winding which activates the rotor, and "M" is the magnetization strength of the rotor 17.

Figure 8:
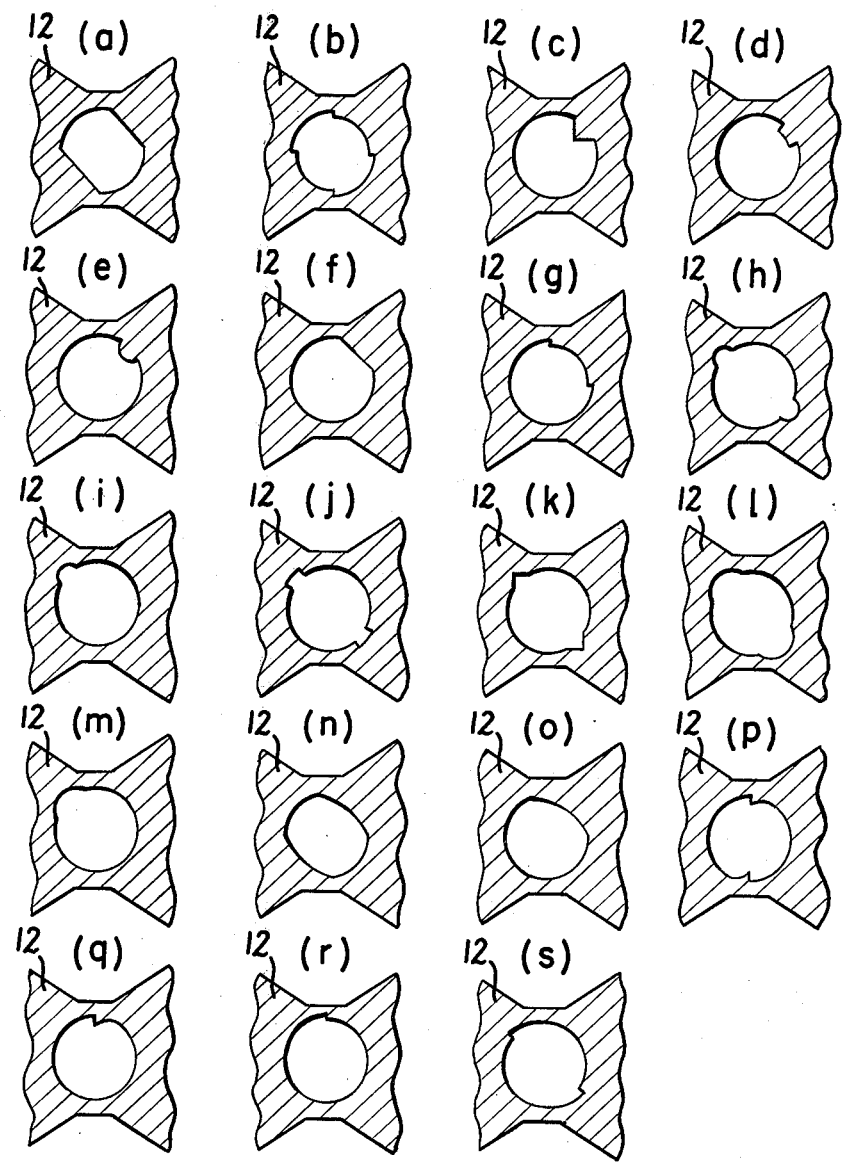
FIG. 8 shows variants of stators having a generally circular portion and being formed as one body for use in the stepping motor of the present invention.

FIGS. 8 (a) to (s) respectively show housing portions of the rotor 17 in the stator 12 which are asymmetrical to the X-axis in FIG. 6. Of these, (a), (b), (h), (j), (k), (l), (n), (p), (s) in FIG. 8 are constituted in a point-symmetrical shape with respect to the center of rotation of the rotor, and the other figures show a point-asymmetrical shape with respect to the center of rotation of the rotor.

The determination of the point-symmetrical shape or the point-asymmetrical shape is decided by the working difficulty level of the housing shape of the rotor 17 in the stator 12 when drive pulses are applied to the coil winding 9. Now comparing the characteristics between the stator of the point-symmetrical shape in FIG. 8(h) and the stator of the point-asymmetrical shape in FIG. 8(i), the relation between the rotor angle $\theta$ and the magnetic potential energy P is represented by curve (N) in FIG. 7 for the stator of the point-symmetrical shape and by curve (M) for the stator of the point-asymmetrical shape.

Therefore, in order to obtain the same operational voltage for each stator, the stator which has the point-asymmetrical shape is more easily manufactured than the stator which has the point-symmetrical shape from the standpoint of the dimension of the recess portion, the stator of the point-asymmetrical shape has a large recess dimension as compared to the stator of the point-symmetrical shape.

Further if it is desired to form a small stator in view of the high speed stepping motor which operates many steps in one second, then the stator of the point-asymmetrical shape, which has a large recess portion, is suitable for this purpose. According to this invention, the manufacturing and assembly are easily attained, and further, slipping of the rest position of the stator caused by impact and vibration is effectively eliminated whereby a stepping motor which has uniform performance is easily obtained. In the various stators shown in FIG. 8, the hole for receiving the rotor (not shown) is formed in the stator at the necked portion so as to define two stator magnetic poles, one on either side of the hole, along the length of the stator. The end faces of the two stator magnetic poles terminate in stator pole faces which are spaced from the rotor with a slight air gap therebetween. The recesses or protrusions which are formed in the stator for determining the rotor rest positions are coterminous with the hole and have sufficiently small circumferential extent with respect to the remaining hole circumference so as to be ineffective and incapable of functioning as separate, independent stator pole faces.

Figure 9:
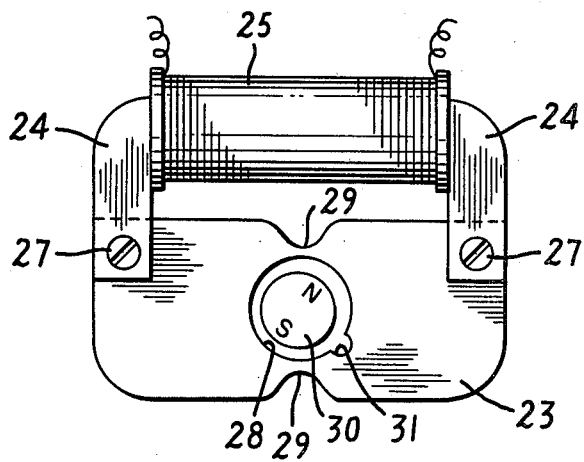
FIG. 9 shows a flat plan view of a third embodiment of the micro stepping motor accordance with in the present invention.
Figure 10:
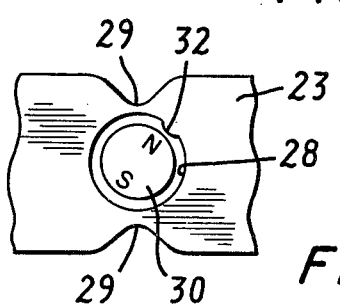
FIG. 10 shows a partial flat plan view of the stator of the present invention.
Figure 11:
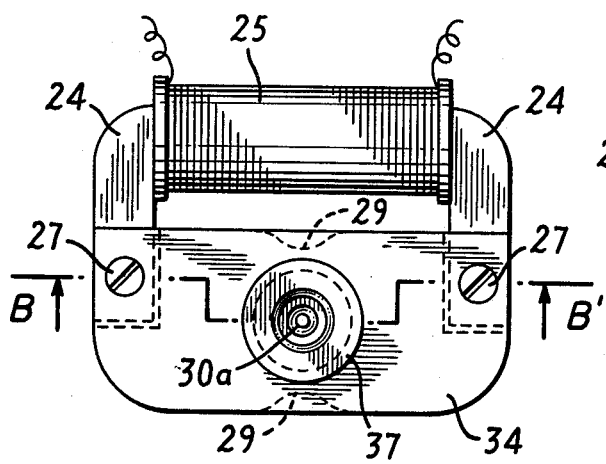
FIG. 11 shows a flat plan view of a variant of the micro stepping motor shown in FIG. 9.
Figure 12:
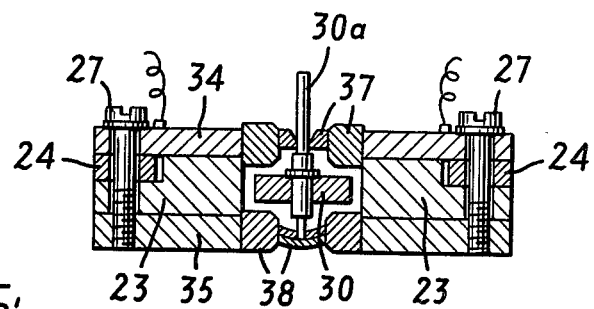
FIG. 12 shows a cross sectional view taken from the line B-B' in FIG. 11.

Referring now to the third embodiment of this invention shown in FIGS. 9 to 12, numeral 23 is a stator which is composed of one plate as one unitary body, a core 24 which has a coil winding 25 is mounted to the opposite end portions of the stator by screw bolts 27 and 27, and a circular stator hole 28 for housing a rotor 30 is formed at a necked portion 29 of the stator. The stator 23 has a thin and constricted necked portion 29 which is located in this embodiment on the center line of the circular hole 28 whereby the magnetic reluctance becomes higher and the inductance of the coil winding 25 becomes smaller. A small recess portion 31, such as indicated in FIG. 9, or a small protrusion portion 32, such as indicated in FIG. 10, are provided at one site around the circumference of the circular hole 28 and are coterminous with the hole 28, the recess and protrusion portions 31 and 32 determining the stationary or rest position of the rotor 30 by defining regions of maximum and minimum reluctance, respectively, for the rotor flux. FIG. 11 and FIG. 12 respectively show a detailed embodiment for the stepping motor of this invention. In this embodiment, the stator 23 is supported by an upper plate 34 and a lower plate 35. The stator 23, upper plate 34 and lower plate 35 are connected together as one body by screw bolts 27 and 27. A rotor shaft 30a of the rotor 30 is rotatably supported by guide pins 37 and 38 as the bearing members which are fixed to the upper plate 34 and the lower plate 35.

According to the stepping motor of this embodiment, the stator 23 which houses the rotor is composed of one plate. Therefore, the manufacturing of the stator and the attachment thereto of the core 24 of the coil winding 25 are easily obtained. By such a construction, the air gap between the rotor 30 and the circular hole 28 is set in a simple manner and at a precise scale, and the air gap is not changed by a mechanical impact applied to the motor. As described hereinabove, the stationary position of the rotor 30 is determined by employing the small recess portion 31 or the small protrusion portion 32 in the circular hole 28. The rotation of the motor is stabilized as there is no slipping of the stator.

Figure 13:
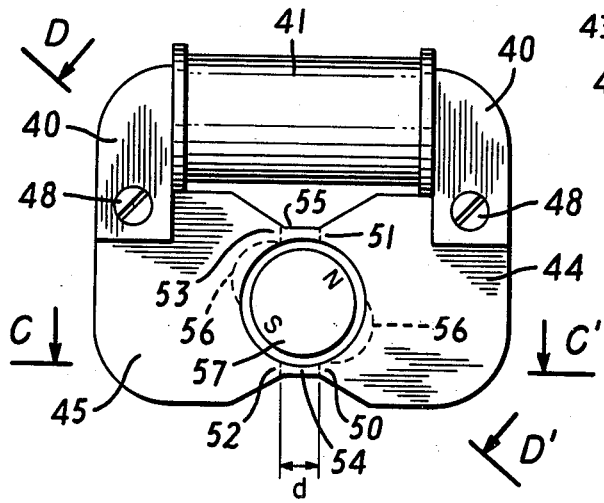
FIG. 13 shows a flat plan view of a fourth embodiment of the stepping motor for a timepiece according to the present invention.
Figure 14:
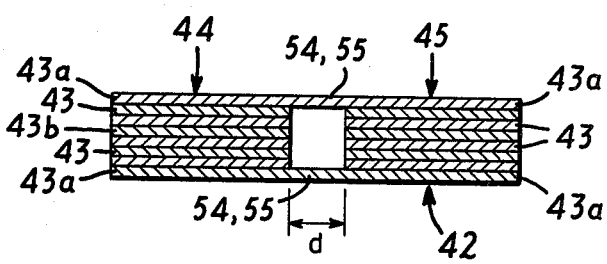
FIG. 14 shows a cross sectional view taken of the stator along the line C-C' of FIG. 13.
Figure 15:
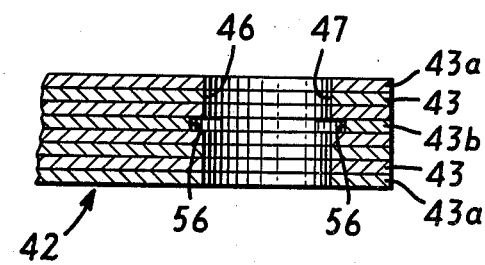
FIG. 15 shows a cross sectional view taken along the line D-D' of FIG. 13.

Referring now to the fourth embodiment of this invention shown in FIGS. 13 to 15, numeral 40 is a magnetic core, a drive coil 41 is wound on the core 40, and a stator 42 is composed of stator elements 43 and 43a including the stator pieces 44 and 45. A plurality of stacked stator elements 43 ... are each composed of two stator pieces 44 and 45 and are magnetically and mechanically coupled to the end portions of the core 40 by screw bolts 48 and 48. The opposite portions of the stator pieces 44 and 45 define an almost circular hole and cavity portion which has inner portions 46 and 47. A rotor which has a pair of magnetic poles N and S and which is composed of a permanent magnet is concentrically and rotatably positioned in the circular hole and cavity portion via a bearing (not shown). A pair of end portions of the inner portions 46 and 47 in the stator pieces 44 and 45, respectively, have thin and sharp beak portions 50, 51, 52 and 53. A gap "d" is positioned between the beak portions 50 and 52 of the stator piece 44 and the beak portion 51 and 53 of the stator piece 45. An upper and a lower stator elements 43a and 43a including the stator pieces 44 and 45 are constructed as one body by the coupling portions 54 and 55 and the beak portions 50 and 52.

Therefore the respective positions of the stator pieces 44 and 45 are maintained in a stationary state by the stator elements 43a and 43a without being affected by external impact and vibration. Recess portions 56 and 56 are provided at the inner portions 46 or 47 of at least one stator element 43b of the stator elements 43 which comprise the stator 42. Therefore the location of the smaller point of the magnetically static potential energy which locates on the line of the stator pieces 44 and 45 is slipped, and then the flux distribution of the stator pieces 44 and 45 is changed according to the recess portion 56.

Therefore, the stationary position of the magnetic poles N and S of the rotor is biased to the slipped position against the connecting line of the stator pieces 44 and 45. The stationary position of the rotor 57 is able to be biased without enlarging the magnetic potential energy which increases by said recess portion, and then the changing of the magnetic potential energy is able to be small in case of the lower level of the working precise of said recess 56. In accordance with the invention, the recess portion 56 is provided only at part of the stator element.

Furthermore, the connecting portions 54 and 55 of the stator element 43a, which are constructed as one body, are made as thin as possible while keeping the needed mechanical strength and high magnetic resistance. Accordingly, the stepping motor of this invention is able to bias the stepping position of the rotor without adjusting the working of the stator by means of the stator which is composed of a plurality of stator elements and by the recess portion of the stator element. Further, the manufacturing and assembly of the stator are easily attained by a part of the stator elements which is constructed as one body. The slipping of the rotor position is not caused by an impact and vibration from outside so that a stepping motor which has a uniform performance is easily obtained.

Figure 16:
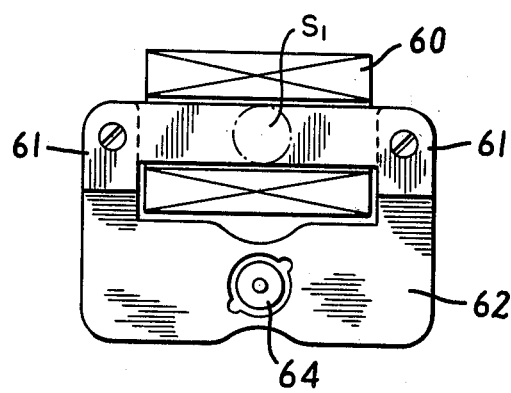
FIG. 16 shows a flat plan view of a fifth embodiment of micro stepping motor according to the present invention.
Figure 17:
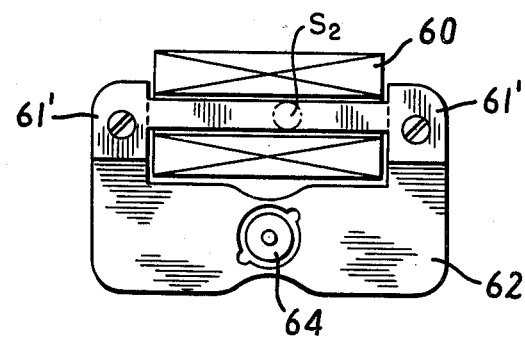
FIG. 17 shows a flat plan view of a variant of the micro stepping motor shown in FIG. 16.

Referring now to the fifth embodiment of the invention shown in FIG. 16 and FIG. 17, a coil winding 60 is wound on a magnetic core 61, a stator 62 is constructed as one rigid body and attached to the magnetic core 61, and a rotor 62 is rotatably positioned within a generally circular opening in the necked portion of the stator 62. The material of the magnetic core 61 has a high permeability and has a higher saturated magnetic flux density than that of the material of the stator 62. Therefore, in the event the width of the magnetic core 61 is greatly reduced, it is still possible for the necked portion of the stator which surrounds the rotor 64 to become magnetically saturated. As a result, comparing the sectional area S2 of the magnetic core 61 of the present invention with the sectional area S1 of another magnetic core 61, it is appreciated that S2 is smaller than S1. As mentioned above, the core portion of sectional area S2 is so small that the micro stepping motor of this invention is very useful for a compact watch.

What I claim is:

1. A micro stepping motor for use in compact electronic timepieces and the like comprising: a magnetic core; a coil winding wound on said magnetic core; a stator having opposite end portions thereof connected to said magnetic core to define therewith a closed magnetic flux path, said stator having a region of reduced cross-sectional area along its length and having a hole extending through said stator at said region defining two stator magnetic poles one on either side of said hole along the stator length with the end faces of said stator magnetic poles defining stator pole faces; a rotor having at least a pair of magnetic poles and being rotatably disposed for rotation about a given axis in said hole with an air gap between said rotor and stator pole faces; and means defining two recesses in respective ones of said stator magnetic poles at diametrically opposite sites around the circumference of said hole and coacting with said rotor for determining the rotor rest or stationary positions, said recesses opening into and being coterminous with said hole and having a sufficiently small circumferential extent with respect to the remaining hole circumference so as to be ineffective as independent stator pole faces.

2. A micro stepping motor according to claim 1; wherein said stator region is located midway along the length of said stator.

3. A micro stepping motor according to claim 1; wherein said stator region has a concaved shape concaving inwardly towards said hole.

4. A micro stepping motor according to claim 1; wherein said two recesses are located about the circumference of said hole such that a line drawn through the centers of said two recesses makes an acute angle with respect to a line drawn through the center of said region between said stator pole faces.

5. A micro stepping motor according to claim 1; wherein said two recesses are located about the circumference of said hole at locations effective to cause said rotor to always resume stepwise rotation in the same predetermined direction of rotation.

6. A micro stepping motor according to claim 1; wherein said magnetic core is composed of magnetic material of higher saturated magnetic flux density than that of said stator.

7. A micro stepping motor according to claim 1; wherein said stator comprises a solid one-piece plate.

8. A micro stepping motor according to claim 1, 2, 3, 4, 5, 6 or 7; further including an electronic timepiece incorporating therein said micro stepping motor for driving the timepiece hands.

9. A micro stepping motor for use in compact electronic timepieces and the like comprising: a magnetic core; a coil winding wound on said magnetic core; a stator having opposite end portions thereof connected to said magnetic core to define therewith a closed magnetic flux path, said stator having a region of reduced cross-sectional area along its length and having a hole extending through said stator at said region defining two stator magnetic poles one on either side of said hole along the stator length with the end faces of said stator magnetic poles defining stator pole faces; a rotor having at least a pair of magnetic poles and being rotatably disposed for rotation about a given axis in said hole with an air gap between said rotor and stator pole faces; and means defining two protrusions on respective ones of said stator magnetic poles at diametrically opposite sites around the circumference of said hole and coacting with said rotor for determining the rotor rest or stationary positions, said protrusions extending into and being coterminous with said hole and having a sufficiently small circumferential extent with respect to the remaining hole circumference so as to be ineffective as independent stator pole faces.

10. A micro stepping motor according to claim 9; wherein said stator region is located midway along the length of said stator.

11. A micro stepping motor according to claim 9; wherein said stator region has a concaved shape concaving inwardly towards said hole.

12. A micro stepping motor according to claim 9; wherein said two protrusions are located about the circumference of said hole such that a line drawn through the centers of said two protrusions makes an acute angle with respect to a line drawn through the center of said region between said stator pole faces.

13. A micro stepping motor according to claim 9; wherein said two protrusions are located about the circumference of said hole at locations effective to cause said rotor to always resume stepwise rotation in the same predetermined direction of rotation.

14. A micro stepping motor according to claim 9; wherein said magnetic core is composed of magnetic material of higher saturated magnetic flux density than that of said stator.

15. A micro stepping motor according to claim 9; wherein said stator comprises a solid one-piece plate.

16. A micro stepping motor according to claim 9, 10, 11, 12, 13, 14 or 15; further including an electronic timepiece incorporating therein said micro stepping motor for driving the timepiece hands.

17. A micro stepping motor according to claim 9; wherein said two protrusions protrude from respective ones of the stator pole faces into said hole.

18. A micro stepping motor according to claim 9; wherein said two protrusions lie wholly in the plane of said stator.

19. A micro stepping motor according to claim 9; wherein said two protrusions have the same thickness as that of said stator as measured in the axial direction of said hole which extends axially through said stator.

20. A micro stepping motor according to claim 9; wherein said stator and two protrusions comprises a solid one-piece structure composed of the same material.

* * * * *